United States Patent [19]
Hale et al.

[11] 3,869,909
[45] Mar. 11, 1975

[54] GAS FLOW VISUALIZATION SYSTEM AND CONTROL APPARATUS

[75] Inventors: Richard W. Hale; Patrick Tan; Richard C. Stowell, all of Ithaca; Donald E. Ordway, Freeville, all of N.Y.

[73] Assignee: Sage Action Inc., Ithaca, N.Y.

[22] Filed: Oct. 1, 1973

[21] Appl. No.: 402,201

[52] U.S. Cl. .................................................. 73/147
[51] Int. Cl. ............................................. G01m 9/00
[58] Field of Search ......... 73/147; 239/557; 261/76, 261/124

[56] References Cited
UNITED STATES PATENTS
2,134,890  11/1938  Redon................................. 73/147
3,769,833  11/1973  Ordway et al. ..................... 73/147

*Primary Examiner*—Jerry W. Myracle
*Attorney, Agent, or Firm*—Bean & Bean

[57] ABSTRACT

An improved multi-operational fluid stream observance system, particularly adapted for use for example in connection with aerodynamic "wind tunnel" studies or the like, wherein helium (or other gas) filled bubbles neutrally buoyant to the airstream are implanted in a moving airstream, so as to provide for optimum visualization of the pattern of airstream flow about a test specimen. The invention features an improved overall system for such purposes, including a novel bubble ingredient supply and system control console apparatus providing a vastly improved versatility with respect to alternative and/or simultaneous employments of pluralities of bubble generating devices of various performance characteristics and capabilities. Thus intricate and/or unsteady air travel patterns may be accurately traced without bursting of the gas bubbles or impacts thereof on the test specimen; and the overall performance of the system may be monitored with improved facility and accuracy.

8 Claims, 6 Drawing Figures

3,869,909

GAS FLOW VISUALIZATION SYSTEM AND CONTROL APPARATUS

BACKGROUND AND OBJECTS OF THE PRESENT INVENTION

Whereas it is known that neutrally-buoyant gas bubbles may be implanted in an airstream to provide superior airflow pattern observation facilities, and whereas bubble forming devices or "heads" have been previously developed for such purposes such as are disclosed for example in U.S. Pat. No. 2,134,890, the present invention provides a novel integrated system including a plurality of bubble forming units or "heads" of different performance characteristics (operable at maximum efficiencies in airstreams of widely different velocities) so as to be selectively and/or simultaneously operated and monitored by means of a single bubble forming ingredient supply and system control console; whereby an observation system of improved versatility and accuracy is provided. The system may also be useful in studying heating and ventilation systems; natural convection airflow studies; wind passage around building studies; cooling systems; blower, fan, propeller, rotor and aircraft testing systems; and studies of fluid flows through pipes, ducts, and the like.

THE DRAWING

Figure 1:
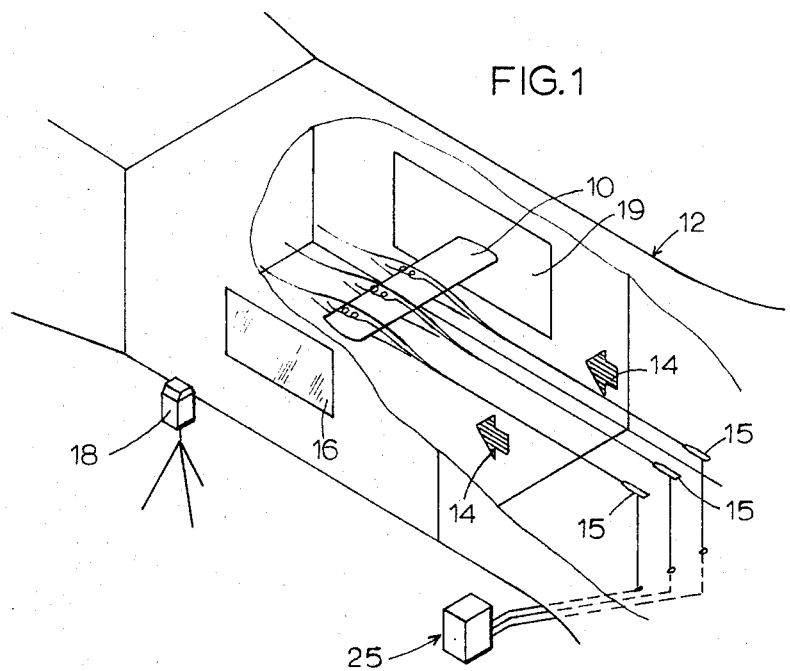
FIG. 1 is a fragmentary perspective view, with portions broken away, to show the interior of a typical wind tunnel equipped with a multiplicity of gas bubble generating heads and a control console system of the present invention.

As shown in the drawing herewith, the control console and system of the present invention is particularly applicable for use in connection with wind tunnel studies or the like wherein an airfoil or other airstream flow obstacle or test specimen as indicated at 10 is mounted within the wind tunnel 12 and in the path of an airstream travelling at controlled rates through the wind tunnel as indicated by the directional arrows 14. A plurality of gas filled bubble generator "heads" such as are illustrated at 15 (FIGS. 2, 3 herewith) are positioned in the tunnel upstream of the test specimen; and as explained for example in U.S. Pat. No. 2,134,890 such heads typically include separate inlet ports for supplies of a bubble forming solution, and air, and a buoyant bubble filling gas such as helium or the like.

Incidental to such studies the wind tunnel is typically provided with a transparent panel such as shown at 16 through which the pattern of travel of the airstream relative to the airfoil 10 may be observed and/or photographed from externally of the wind tunnel such as by means of a still or motion picture or television camera 18. To maximize the observation results a dark back board illustrated at 19 may be provided in opposition to the line of view through the window 16; and a light source (not shown) may preferably be disposed at the downstream end of the tunnel, so as to direct a beam of light longitudinally of the tunnel in opposition to the direction of flow of the airstream.

Figure 2:
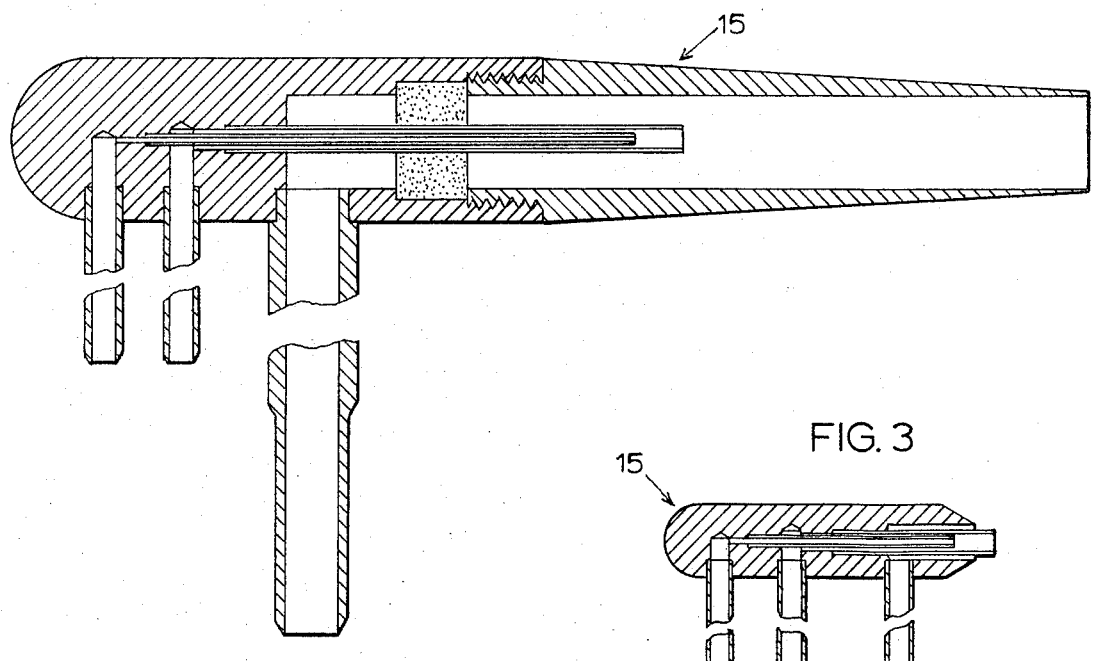
FIG. 2 is an enlarged scale sectional view through a typical "high speed" bubble forming head such as is included in the array shown in FIG. 1.
Figure 3:
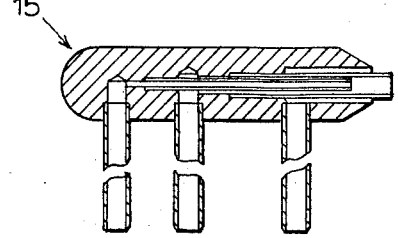
FIG. 3 is a view corresponding to FIG. 2 but showing a "low speed" head such as may be included in such an array.

In connection with air tunnel studies such as referred to and illustrated herein, it is often desirable to obtain observation readings on the airstream behavior as it flows across/around an obstacle and/or different portions thereof under different relative air speed conditions. Accordingly a facility including any required number of bubble generating heads such as are shown for example at 15 (FIG. 1 of the drawing herewith) may be arrayed within the air tunnel upstream of the test specimen, supported therein by any suitable means (not shown). FIG. 2 of the drawing illustrates for example a so-called "high speed" bubble generating head; meaning a head which is externally of such aerodynamic configuration and which is internally designed so as to operate with maximum efficiency for its intended purpose within a relatively high speed airstream. Further by way of example, FIG. 3 illustrates a relatively "low speed" bubble generating head which is operable at maximum efficiency when functioning in connection with a relative low speed airstream. It is to be understood that any desired number and variety of head designs may be employed to provide the desired unitary array of variably operable heads such as may be conveniently mounted in the air tunnel as a single unit located upstream of the test specimen.

Figure 4:
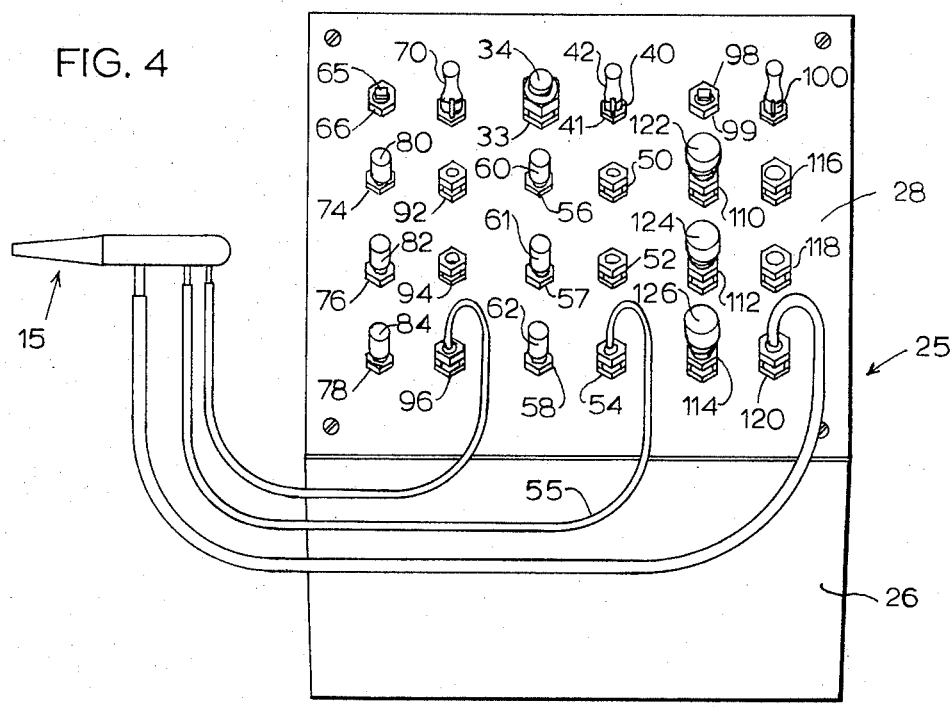
FIG. 4 is a top perspective view of an example of the console of the invention showing only a single head operatively connected thereto with a view to simplifying the illustration.
Figure 5:
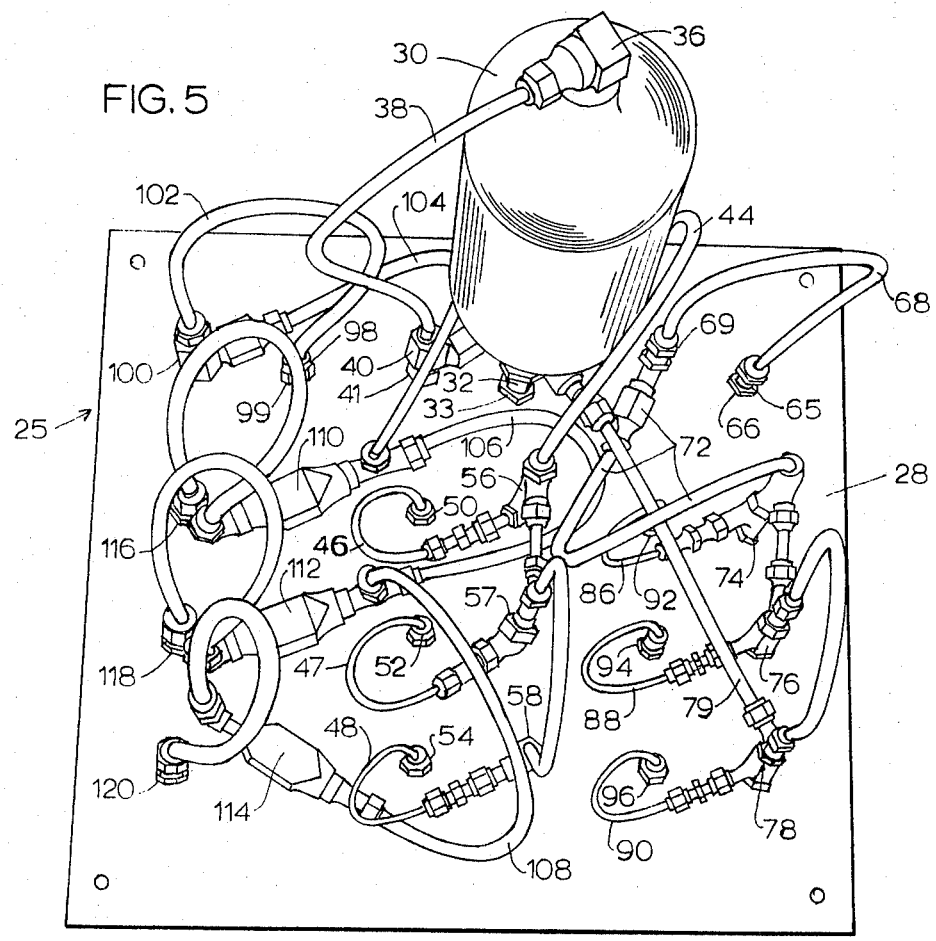
FIG. 5 is a perspective, inverted, view (on enlarged scale) of the bottom interior surface of the top cover member of the console when disassembled from the console case, and of the apparatus suspended therefrom.

The system of the invention features a selectively operable bubble-generating system supply and control console such as is shown generally at 25, (FIGS. 1, 4, 5, of the drawing herewith). The console 25 comprises an outer casing 26 which may be of cubical or other desired configuration, including a top cover or panel portion 28. Interiorly of the casing 26 a bubble-film-making solution container such as is shown at 30 is suspended to hang from and below the top panel 28 as by means of a threaded pipe nipple 32 and suitable lock nuts 33. As shown herein the upper (outer) end of the nipple 32 is provided with a screw cap closure 34 which is removable for purposes of replenishing the bubble film supply material from time to time as the container is emptied.

The bubble film solution carried by the container 30 may be of any preferred form, such as any suitable soap, detergent, or the like. The outlet for the film-making solution is provided at the bottom of the container 30 as illustrated at 36 (FIG. 5), and may comprise a screw-threaded connected conduit or flexible tube 38 leading through a toggle valve 40 the body of which is also carried by the top plate 28 as by means of a suitable screw thread connection device as indicated at 41, FIGS. 4, 5. Thus manipulation of the toggle valve 40 by means of its control handle 42 which extends above the top plate 28 provides a convenient on-off control of delivery of film-forming solution from the container 30 through a tube 44 responsive to pressure when applied to the interior of the container 30 from an external supply of helium under pressure as will be explained hereinafter. The tube 44 feeds a three-way manifold system including conduits 46, 47, 48, which are arranged to supply the solution to outlet port connection devices which are also carried by the top plate 28. The outlet connections 50, 52, 54, may be equipped with screw threaded cap nuts at their upper ends for closing off the ports when not in use. In the drawing herewith (FIG. 4) the solution outlet port 54 only is shown as being coupled to a flexible tube 55 which leads to the solution inlet connection of a bubble generating head; but it is to be understood that the other outlet ports will be similarly connected by way of flexible conduits to the other heads of the array (FIG. 1).

The conduits 46, 47, 48, are equipped with metering valves as shown at 56, 57, 58; said metering valves being also mounted on the top panel 28 as by means of screw thread mounting connectors so as to project therethrough. At their upper (outer) ends the metering valves are provided with vernier type control knobs as illustrated at 60, 61, 62, respectively. Thus, it will be understood that the control device 62 may be manually adjusted from externally of the console so as to regulate the rate of passage of solution to its associated bubble generating head in response to introduction of helium under pressure into the container; and that corresponding control devices of any number of similar bubble generating heads may be so operative.

At FIGS. 4, 5, the helium inlet port is designated by the numeral 65, and comprises a threaded pipe nipple mounted to project through the top panel 28 as by means of lock nuts 66, and is adapted to be connected by a suitable conduit means to an external source of helium (or other gas) under pressure. A conduit 68 (FIG. 5) leads from the gas inlet connection 65 to the inlet port of an on-off valve 69; the upper end of which projects through the top plate 28 and carries a manual control lever 70. Thus, on-off control of the helium (or other gas) supply for the entire system is readily available by simple manual operations of the valve control device 70.

The valve 69 delivers the gas under pressure through a conduit 72 to a conduit manifold system which as shown herein is arrayed for delivery of the gas under pressure into the inlets to corresponding metering valves which are also mounted as to project at their upper ends through the top panel 28, such as are illustrated at 74, 76, 78, respectively. The gas manifold system also supplies gas to pressurize the container 30 as described hereinabove, through conduit 79. The upper ends of the metering valves carry vernier type adjustment knobs 80, 82, 84, respectively (FIG. 4), and the outlet ports of the metering valves connect by means of corresponding conduits 86, 88, and 90 to the lower ends of outlet connection ports 92, 94, 96. It is to be understood that whereas the console arrangement illustrated and described in detail herein provides for only supply to and monitoring of three separate bubble forming heads, it may be analogously designed and constructed as to service any other number of heads.

Figure 6:
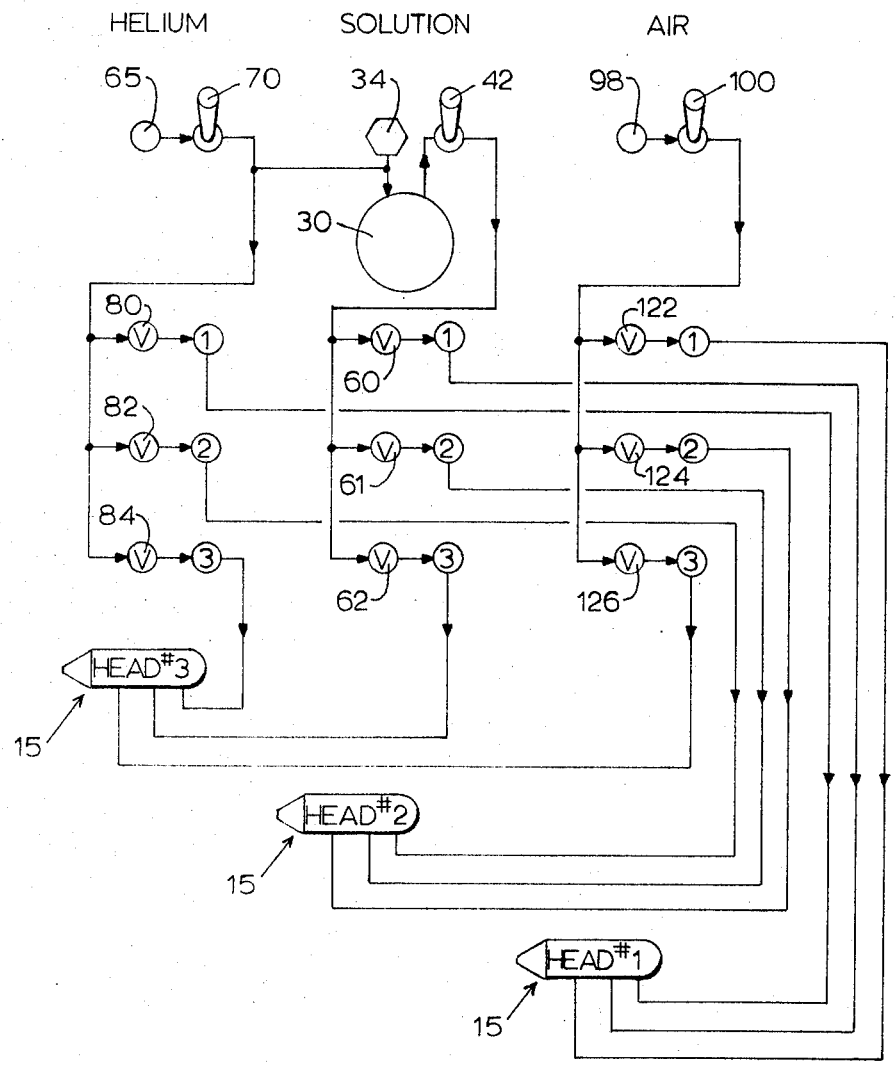
FIG. 6 is a schematic of one example of a system console control of the invention.

FIGS. 4, 5, illustrate the compressed air inlet or supply port 98, which is mounted on the top plate 28 as by means of lock nuts 99, and is arragned to be on-off controlled as by means of a toggle valve 100 which is mounted on and extends through the top plate 28 as explained hereinabove. As shown at FIG. 5, the inlet port 98 delivers compressed air to the toggle valve 100 as by means of a conduit 102; and the outlet from the valve 100 leads through a conduit 104 to a manifold system comprising conduits 106, 108. This conduit system feeds compressed air to metering valves 110, 112, 114, which in turn supply compressed air to outlet connections 116, 118, 120. The metering valves 110, 112, 114, are arranged to be controlled by vernier knobs 122, 124, 126. FIG. 6 is a schematic illustration of a typical control system of the invention as set forth hereinabove.

Thus it will be understood that the system control console of the invention provides a unique facility whereby the operator of the system may by simple manual manipulations of the on-off and metering valve controls adjust the array of bubble generating heads so as to meet prescribed bubble generating requirements, as well as fluctuating conditions incidental to the wind tunnel operation. For example, in the course of any given test program it is often desirable to vary the rate of generation and/or size of gas bubbles in the airstream. Furthermore it is often desirable to adjust the buoyancy characteristics of the bubbles, especially in connection with studies involving intricate airflow patterns. These characteristics and/or requirements are readily regulatable by virtue of the novel control console arrangement of the invention, simply by manual adjustments of the control devices available on the top panel of the console for regulation and/or monitoring of the flow rates of compressed air and helium and bubble making solution through the control console to the heads. It will of course be also apparent that the buoyancy characteristics of the bubbles so generated will also be a function of the physical properties of the bubble making solution; and that these will accordingly be so selected and/or adjusted to provide the preferred results.

Thus, it will be understood that the unitary control console provides a facility for monitoring/adjusting the bubble-size, buoyancy, and generation rates of the various heads of the array independently of one another, while at the same time providing an improved combination supply and control facility for wind tunnel studies or the like. Whereas only the bubble-forming solution container is illustrated herein as being mounted upon the top panel of the console, it is to be understood that similar containers for the other supply materials may also be integrated into the unitary console.

We claim:

1. A system for supplying and monitoring the gas flow visulization performance of gas bubbles entrained in intricate and/or unsteady airstreams relative to a test specimen such as in wind tunnel studies or the like, said system comprising in combination;

an array of gas bubble generating heads disposed upstream of the test specimen;

supply means for supply of bubble forming solution and supply of compressed air and supply of bubble forming gas for each of said heads;

a supplies control and bubble performance monitoring console, said console including:

a controls support panel;

a manually operable on-off valve for each of said supply means, said on-off valves being mounted on said panel for control of supplies from said supply means;

a plurality of outlet devices carried by said panel and separate conduits detachably connected to said outlet devices and to said bubble generating heads;
separate manifold conduit devices each coupled at its inlet to the outlet of a corresponding one of said on-off valves and leading to a corresponding one of said outlet devices carried by said panel;
and an outlet flow rate metering valve for each of said outlet devices, each said metering valve being mounted on said panel for manual regulation incidental to monitoring of the performance of the system.

2. A system as set forth in claim 1 wherein at least one of said gas bubble generating heads differs from the others in respect to their bubble generating capabilities.

3. A system as set forth in claim 1 wherein at least one of said gas bubble generating heads differs from the others in respect to their aerodynamic characteristics.

4. A system as set forth in claim 1 wherein at least a portion of said means for supply of said heads is mounted upon and carried by said console.

5. A system as set forth in claim 4 wherein at least a portion of said supply means is mounted upon and is carried by said controls support panel.

6. A system as set forth in claim 1 wherein said metering valves are controlled by vernier type control means.

7. A system as set forth in claim 1 wherein said on-off valves are of the toggle-lever controlled type.

8. A system as set forth in claim 1 wherein said console provides means whereby the bubble-size, buoyancy, and generation rates of each of said heads may be monitored/adjusted independently of the others of said heads.

* * * * *